United States Patent Office 3,333,980
Patented Aug. 1, 1967

3,333,980
ORGANOPHILIC AND HYDROPHOBIC PARTICLES AND METHOD FOR THEIR PREPARATION
Andrew T. McCord, Snyder, N.Y., assignor to The Carborundum Company, Niagara Falls, N.Y., a corporation of Delaware
No Drawing. Filed Jan. 8, 1964, Ser. No. 336,371
2 Claims. (Cl. 106—308)

The present invention relates to new and improved, finely divided discrete particles possessing hydrophobic and organophilic properties, and to a new and improved method for treating such particles to provide such properties.

The surface condition of any substance in great measure determines the property known as "wetting." Some materials are preferentially wetted by water, others by organic liquids, and a few are not wetted by either. This invention contemplates the production of a water-repellent, oil-wettable surface on a wide variety of materials, and it is also concerned with producing a surface condition which increases the dispersion of the finely divided particles in organic media, particularly in paint oils and lubricating oils.

The materials which may be treated in accordance with the present invention are numerous as they span both organic and inorganic substances. However, all such materials must have a common inherent characteristic, and that is insolubility in water. More specifically, a water-insoluble particle contemplated by the present invention is one which has a water solubility of less than about 0.3%, i.e. about 3 grams per liter, e.g. anhydrite $CaSO_4$ which has a solubility of 0.267%.

While a detailed listing of all of the individual materials so treatable is not feasible, the following partial listing is illustrative of the wide variety of materials to which the inventive surface treatment is adapted, although not necessarily limited.

The invention is particularly adapted to the surface treatment of pigments used in the manufacture of paint and cosmetics. Typical inorganic pigments include titanium dioxide; zinc sulfide; lead oxide; basic lead carbonate; lead sulfate; zinc oxide; metal chromates, e.g. of lead, zinc and barium; metal molybdates, e.g. of iron and lead, iron blues; iron hydrates and oxides, and like pigments possessing high hiding power. The organic pigments such as the organic lakes (e.g. dyes precipitated with $Al_2O_3$), and the dry colors, e.g. solid organic dyes, are also included. The average particle size preferably ranges from about 0.15 micron to about 25 microns.

Particulate material beneficial for use as paint extenders are likewise readily surface treated in accordance with the invention. Typical paint extender particles include anhydrites, especially $CaSO_4$; metal carbonates, e.g. of calcium, magnesium and barium; silicates, e.g. of calcium, magnesium and aluminum; sulfates, especially barium sulfate; oxides, especially silica, and hydrous oxides. Clays, micas, talcs, kaolins and slate flours are also contemplated, and these particles preferably range from about 0.1 micron to about 25 microns average size.

Media in which these treated pigments and extenders show superior dispersion include drying paint oils such as linseed oil, sunflower seed oil and dehydrated castor oil, alkyds, liquid elastomers and synthetic resins and plastics.

The inventive surface treatment is equally applicable to organic and inorganic particles particularly adapted for use as fillers and bonding agents in the manufacture of refractories and plastics. For example, carbon black and zinc oxide can be surfaced with a thin coating of natural or synthetic rubber in the manufacture of tires, while colloidal silica can be surface treated in the manufacture of bonded refractories. These particles may range down to 0.01 micron, average size.

Likewise, various refractory and abrasive particles may be surface treated in accordance with the invention. Examples of these particles are: the oxides, carbides, nitrides, borides, phosphides, silicides and sulfides of various metals and semi-metals, such as aluminum oxide, silicon carbide, thorium nitride, titanium boride, molybdenum phosphide, tantalum silicide and uranium sulfide; the nitrides of boron and silicon; the carbides of silicon and boron, aluminum oxide and nitride, and the oxides, carbides and nitrides of zirconium, hafnium, columbium, tantalum and titanium.

Still other particulate materials capable of being surface treated in accordance with the present invention include finely divided water insoluble minerals and ores, and secondary metallurgical products such as slags, fumes, dusts and various other byproducts. The preferred average particle size is in the range of 30 microns or less, and a typical powder would be the iron oxide residue from a blast furnace operation, which residue may be so surface treated and formed into pellets for reuse as an ideal furnace feed.

As noted above, and wherever compatible, this invention also contemplates incorporating various oil soluble dyes, solvents, rubbers, resins, elastomers, latices, synthetic and natural resins and plastics in the fatty acid vehicles described below, in order to produce the desired characteristics of these additional ingredients in the coating.

The present invention may be said to be based upon the discovery that a very thin oriented layer of fatty acid may be deposited over the surface of any water insoluble particle while in an aqueous medium, to render the same both hydrophobic and organophilic, provided such surface is enveloped with a polyvalent metallic hydrate which is a base or contains adsorbed base in such aqueous medium. More specifically, such surface treatment renders the finely divided, water-insoluble, discrete particles both water repellent and oil dispersible.

The term "fatty acid" referred to above, is utilized herein in its broadest sense and includes not only the saturated acids, both normal and branch chain, but also includes unsaturated acids, certain substituted acids, such as those having hydroxy- and keto-acid substituents, aliphatic acids containing alicyclic substituents, such as chaulmoogra-oil acids, and certain alicyclic acids, such as the naphthenic acids, which contain no aliphatic chain. The acid will have six or more carbon atoms and may be mono- or poly-carboxylic.

The term "oil dispersible," means that the treated particles not only wet easily in oil, but that each particle tends to exist in separate unflocculated form in the oil, or may be distributed in this form with a minimum of mechanical mixing. Such a dispersion usually, but not necessarily always, indicates that each particle carries an electric charge or envelope which prevents it from touching or sticking to other particles.

While the physical chemistry of surfaces is highly involved, a discussion of the theory underlying the present invention is believed to be appropriate at this point. A small particle of any substance has adsorbed on its surfaces, water or gases, usually oxygen and nitrogen from the air. When such a particle is placed in water, these gases invariably remain on the surface. When a system of water containing a hydrolyzable salt of a polyvalent metal such a zirconium, aluminum, iron, etc. contains a quantity of such particles, some of the gases are replaced by the hydrolyzable salt on the surfaces of the particles. When the pH of the system is adjusted to about 7-8, the adsorbed salts hydrolyze, leaving adsorbed metal hydrates on the surfaces of the solid. At the same time, the metal hydrate, which is produced in the aqueous medium, flocculates and so concentrates on the surfaces of the particles.

For example, when a dilute solution of aluminum sulfate is adjusted to 7.5 pH with ammonia, a voluminous precipitate of aluminum hydroxide appears throughout the liquid. However, when this solution contains the equivalent of a very large surface in the form of fine insoluble particles, the first effect will be the adsorption of some aluminum sulfate on the surfaces of the particles. When hydrolysis is effected by neutralization, the hydrolized aluminum hydroxide becomes attached to the particle surfaces and there is visible flocculation of the particles. Considering just one particle of solid material in this system, such particle now has some adsorbed aluminum hydroxide on its surfaces, and some aluminum hydroxide sticking to its surfaces. This hydroxide carries with it considerable water and some adsorbed alkali, and it is also intensely reactive. If a very small quantity of a fatty acid is now introduced, it combines with the adsorbed alkali, the acid or polar end of the long carbon chain of the fatty acid fastening into the aluminum hydroxide at the point where there is trapped alkali, and the fatty or non-polar end of the chain sticking out. When several such long chains become attached to the envelope around the particle, it appears that water is forced from the surface and the particle will no longer become wetted. When this happens, many such particles adhere to each other and intense flocculation occurs.

Returning now to the point in the system where there is a single particle of solid material, in water, with adsorbed and attached aluminum hydroxide, the latter containing, in turn, some trapped or adsorbed alkali; if sufficient fatty acid is added to combine with all of the adsorbed alkali to form an alkali soap, the particle is now coated with aluminum hydroxide from which radiate the fatty acid chains of the alkali soap, such as sodium, potassium or ammonium soap. Then, further additions of fatty acid combine with some of the aluminum hydroxide, and some metallic aluminum soap is produced. Some is directly attached to the surfaces, derived from the adsorbed hydroxide, and some surrounds the particle, derived from the hydrate surrounding the particle. The end result is that the particle is completely wetted by aluminum and alkali metal or ammonium soap molecules, oriented with the long fatty acid chain radiating from the surface. Basically, what has been accomplished in this case, is the coating of a small particle with a very thin surface of oriented alkali and metal soap molecules, and because the surface is "clean," the bond is very strong.

When a substance is so coated, and is dried at room temperature or at any temperature up to and including 110° C., this substance exhibits a surface which is strongly water-repellent and easily and immediately oil-wettable. It has been observed that, when fine particles are so surface treated, any movement of the particle such as mixing, disintegrating, etc., tends to produce an electrical change in the surface of each particle, resulting in particles which flow easily and do not tend to aggregate.

The surface treatment of the invention is performed in an aqueous medium so that after the initial surfacing, the product is in a water slurry. In this form, the excess water may be removed by decantation, filtering, or any other well known means. It also has been observed that the filter rate of the treated slurry of particles is invariably many times faster than that of an untreated slurry. After drying, the product exhibits the desired hydrophobic and organophilic surface properties.

Theoretical calculations suggest that to obtain a monomolecular surface of a fatty acid, such as stearic acid, with a molecular weight on the order of 280 grams, on 100 grams of particles, such as $Al_2O_3$, with a specific gravity of 4.0, the relationship is approximately as follows, for very fine particles of 1 micron or less.

| Average particle size (microns): | Weight of fatty acid needed (grams) |
|---|---|
| 1.0 | 0.11–0.12 |
| 0.5 | 0.22–0.24 |
| 0.2 | 0.55–0.60 |
| 0.1 | 1.10–1.20 |
| 0.01 | 11.0–12.0 |

If a monomolecular layer of the fatty acid could be arranged over the surfaces of the powder, with the polar or acid ends attached to such surfaces and the non-polar ends or fatty chains pointing outwardly from such surfaces, the powder will, as noted above, possess strong hydrophobic and oleophilic properties.

The graphic formula for stearic acid looks like this:

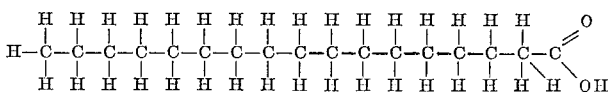

When the acid end

attaches to a surface, the long 17 carbon atom chain sticks out from the surface, and a sufficient number of these fatty chains will prevent water from wetting the surface. Many substances possess surfaces which prefer to be wetted by water. In fact, most substances are soluble to some degree in water and their surfaces are completely wetted.

Ordinary physical mixing of a fatty acid directly with fine particles will not produce even distribution of the fatty acid on the surfaces, nor will the fatty acid be oriented with its polar ends attached to the surfaces. Any water-repellent product made in this manner will contain considerable quantities of fatty acid, will not be free flowing, but will be a greasy, sticky composition. However, when following the technique of the invention, the fatty acid is attached to the surfaces of the particles in an oriented, molecular layer, with the polar ends of the fatty acid chains attached to such surfaces and the chains radiating outwardly from these surfaces, and the product is a dry, non-greasy, free flowing powder. In fact, the product will even be very distinctly more free flowing than the original untreated material.

In summary, the following facts have been combined to make this discovery possible.

(1) Most powders and pigments, with particle sizes in the range from about 0.01 micron to about 30 microns may be dispersed in water by means of a small quantity of a water soluble metallic oxychloride. These oxychlorides result from the solution of the anhydrous chloride in water and may sometimes be described as hydrous chlorides or basic chlorides. For example, titanium tetrachloride, $TiCl_4$, dissolves in water and the following species have been postulated: $Ti(OH)Cl_3$, $Ti(OH)_2Cl_2$, $Ti(OH)_3Cl$. Similar compounds result when $ZrCl_4$, $HfCl_4$, $Al_2Cl_6$, $SnCl_4$ and $SbCl_3$ dissolve in water. Such dispersed particles suggest that to some extent, these basic chlorides are adsorbed on the surfaces of the particles and set up an electrically charged envelope which results in this excellent dispersion. Agitation or milling is useful to produce this dispersion, which is observable in the microscope.

(2) When any water solution of a hydrolyzable polyvalent metal salt is neutralized to higher than 7 pH, i.e. 7.1, 7.2 etc., the hydrous oxide or hydrate of the metal so produced contains some of the alkali or base used in the neutralization. This alkali is adsorbed in the hydrate and is not removed by washing with neutral (7 pH) water.

(3) When such a solution contains particulate matter, such as pigment or powder, and is neutralized as in 2 above, each particle becomes surrounded by and enmeshed in the metallic hydrate envelope. If these particles are separated at this stage, they will exhibit an alkaline reaction because all of the surfaces are coated with a metallic hydrate containing adsorbed base.

(4) Without separation, the solid materials in this mixture will take up a fatty acid, which becomes attached molecule by molecule to the adsorbed base, and with the acid end in the metal hydrate gel, the fatty end radiating outwardly. When the base in the particle surface has been neutralized, sufficient fatty acid has been added to render each particle hydrophobic.

(5) Separation of the solids from the liquid at this point by any means well known in the art, like filtering, centrifuging, and drying of the solids at 100° C. produces a free flowing water-repellent, oil wettable product.

(6) In some cases, it has been found unnecessary to obtain dispersion of the solid materials as in 1 above, although the use of these metallic oxychloride dispersing agents is preferred in order to insure uniform coating of the particles. Theoretically at least, any hydrolyzable polyvalent metallic salt can be employed to obtain the desired hydrate upon neutralization, as will be evident from certain of the examples to follow, since those metallic salts which do not disperse, and even flocculate, produce the desired results.

(7) When the particles are alkaline to begin with, such as ZnO, MgO, CaO and CdO, it has been found that forming a slurry of such particles in water produces an alkaline reaction and the particle surfaces are hydrates. Hence, there is no need to add a metallic salt or a neutralizer, it merely being necessary to add and mix the fatty acid to the slurry, in order to produce the desired results.

Accordingly, it is a primary object of the present invention to produce new and improved, water-insoluble, finely divided, free flowing, discrete particles provided with a water-repellent and oil-wettable surface coating, and thereby rendered readily dispersible in organic media.

Another primary object of the invention is to provide a new and improved method of treating such particles to produce such surface coating thereon.

Another object of the invention is to improve the filter rate of fine particle slurries wherein the particles have been treated in accordance with the invention.

Other objects and advantages of the invention will become apparent upon consideration of the following detailed description.

The inventive particles may be generally described as being provided with an alkaline surface which has been neutralized with a fatty acid. Where the particles are neutral or acidic, i.e. produce a pH of 7 or less in water, e.g. $TiO_2$ particles, this alkaline surface comprises a polyvalent metallic hydrate containing adsorbed base neutralized with the fatty acid. Where the hydrate is that of a metal whose oxides are classed as acidic, the only soap formed will be that of the adsorbed alkali, regardless of the amount of fatty acid employed. However, where the hydrates are those of the metals whose oxides are classed as alkaline or amphoteric, the addition of more than the stoichiometric amount of fatty acid required to neutralize the adsorbed alkali will result in the formation of a metallic soap with some or all of the hydrate. Where the particles are alkaline, i.e. produce a pH of more than 7 in water, e.g. ZnO or MgO particles, they already possess an alkaline surface which is neutralized directly by the fatty acid.

The inventive process may generally be described as comprising the following steps:

(1) Producing an alkaline surface on the water-insoluble particles in an aqueous medium, and then (2) Neutralizing such alkaline surface while in the aqueous medium with fatty acid.

When surface treating non-basic particles which produce a pH of 7 or less in water, the alkaline surface or envelope is produced on such particles by:

(a) Forming an aqueous slurry of the particles in a hydrolyzable polyvalent metallic salt solution, and by (b) Alkalizing the slurry beyond 7 pH with a water soluble base compatible with such metallic salt, to precipitate a polyvalent metallic hydrate containing adsorbed base on and around the particles.

When surface treating particles which produce a pH of more than 7 in water, there is no need for adding the metallic salt or water soluble base. All that is necessary is to form a slurry of the particles in water, and then add the fatty acid to form the surface coating.

Since the neutral or acidic particles are more prevalent, emphasis will be placed on their surface treatment throughout this description. However, it is to be understood that the invention is equally applicable to the alkaline particles.

With respect to such neutral or acidic particles, the preferred procedure for producing the slurry involves mixing the finely divided paticles in water, and then adding the soluble polyvalent metallic salt or salt solution to the water slurry. Preferably, the metallic salt is a metallic chloride which will form an oxychloride in water because these chlorides are effective in dispersing the particles in the water in order to insure complete coating thereof. The amount of salt added should be that sufficient to provide from about 0.05% to about 2.0% of metallic hydrate (calculated as oxide) based upon the weight of the material to be treated. Of course, the slurry of particles and dilute salt solution are thoroughly mixed and alkalized preferably to about 8 pH with a water soluble base compatible with the hydrate and preferably one of the following: sodium, potassium or ammonium hydroxide, or carbonate. At this point, the particles are intimately mixed with the precipitated hydroxide of the polyvalent metal which was present as soluble salt, and sometimes heavy flocculation occurs. If this happens, the excess water may be removed by decantation. However, flocculation may be light or absent, in which case no water can be easily separated. To this alkaline system is now added, with good agitation, a minor amount of a free fatty acid, and this may be added directly if it is a liquid, or it may be dissolved in any solvent in which it is soluble if it is a solid or a liquid. The acid is rapidly absorbed by the solids, and if desirable, the solid material may be separated from excess liquid and dried. However, this separation is not necessary, being convenient only in that the drying time can be reduced by removing as much water as possible. Separation of the water at this point has always been more rapid than from the untreated slurry. As noted above, the fatty acid is attached to the hydrous oxide coating the solid particles, and the amount of fatty acid employed is subject to variation, but is usually on the order of about 100% to about 200% by weight of the oxide content of the precipitated hydrate, with the minimum being the stoichiometric amount required to neutralize the adsorbed base.

Just as with the finely divided particles, a wide variety of water-soluble metallic salts, water-insoluble metal hydroxides, and water-soluble bases may be employed in the inventive process. The applicable polyvalent metallic salts so usable are defined as those producing on neutralization a metallic hydroxide with a solubility constant of less than $3 \times 10^{-4}$ moles per liter. The metals included are those of the following groups in the Periodic Table: all the metals in groups II–B, III–B, IV–B, V–B, VI–B; Mn in VII–B; Fe, Co and Ni in VIII; Cu in I–B; Al, Ga and In in III–A; Ge, Sn and Pb in IV–A; Sb and Bi in V–A; Po in VI–A, and the metals of the lanthanide and actinide series. The preferred polyvalent metallic salts are those derived from the commercial acids, such as the chlorides, sulfates, nitrates and acetates.

The usable bases may be either organic or inorganic, so long as they are capable of reacting with the particular metallic salt employed. The inorganic bases include the alkaline metal oxides, hydroxides and the carbonates, the alkaline earth oxides and hydroxides, and ammonium hydroxide. The organic bases include ammonia and all its organic derivatives. The preferred bases are the sodium, potassium and ammonium hydroxides or carbonates.

The usable fatty acids have been defined above and these, of course, may be dissolved in a suitable organic solvent compatible with the system, which solvent may be an alcohol, a ketone, an ether, an ester or a liquid hydrocarbon (viz. petroleum oil). In addition, the fatty acid may be dissolved with liquid rubbers or resins which are soluble in the solvent, and the solvent may be volatile or not, depending upon whether it is desired to have the solvent remain in or leave the surface coating.

In order to place the various amounts and percentages of materials used in focus, a hypothetical example dealing with 100 grams of $Al_2O_3$ pigmentary particles having an average particle size of about 1 micron will now be described.

The amount of metallic hydrate to be deposited on the pigment varies from 0.05% (0.05 gram calculated as oxide) to possibly 2 grams in the case of exceptionally fine particles. On the average, the range is from about 0.05 gram to about 0.1 gram. This hydrate, in turn, could contain from a minimum of about 1% to a maximum of about 10% of its weight (as oxide) of adsorbed alkali. Based on 10% content, the alkali range is from about 0.005 gram to about 0.01 gram on the average. When the fatty acid is added to neutralize this adsorbed base, the amounts of fatty acid needed are determined as follows, for the preferred single chain type acids and preferred bases listed below.

tralized such as by addition of ammonia, then the addition of the fatty acid will cause the formation of an aluminum soap.

If one were to use linoleic acid (molecular weight 280) as an example, the chemical reaction would be as follows:

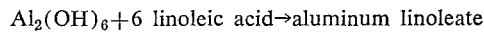

The aluminum linoleate has the formula:

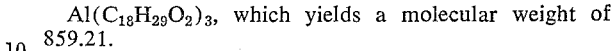

Since 102 grams of $Al_2O_3$ equivalent combines with 1680 grams of linoleic acid, and since 0.05 gram of $Al_2O_3$ has been precipitated as hydrate onto the pigment, 0.825 gram of linoleic acid will be required to neutralize the aluminum hydroxide ($1680/102 \times 0.05 = 0.825$).

In order to neutralize not only the adsorbed base in the precipitated aluminum hydrate, which requires 0.2 gram of linoleic acid, but also to convert all of the aluminum hydrate into aluminum soap, which requires 0.825 gram, a total of 1.025 grams linoleic acid would be needed.

In summary, for 100 grams of $Al_2O_3$ of 1 micron average particle size, the following conclusions are evident. If one neutralizes only the base adsorbed in the $Al_2O_3$ coating, the amount of fatty acid will be about 0.2%, based on the weight of material to be surfaced. If, however, one neutralizes the adsorbed base and all of the aluminum hydroxide with fatty acid, the amount of fatty acid will be approximately 1%, based on the weight of the material being treated. In actual practice of the invention, these values will be doubled because the acid is not always pure, is often a weak acid, and is sometimes a mixture, and because more base than postulated may be adsorbed.

It is important to keep in mind that only certain non-acidic hydrates (including amphoteric hydrates) are capable of yielding metallic soaps in this environment and these hydrates are lead, copper, beryllium, zinc, cadmium, mercury, aluminum, gallium, chromium, indium, lantha-

| Fatty Acid | Molecular Weight | Base | Molecular Weight |
|---|---|---|---|
| Stearic (18 carbons) | 284.47 | NaOH | 40 |
| Oleic | 282.45 | KOH | 56.1 |
| Linoleic | 280 | NH$_4$OH | 35 |
| Palmitic | 256.42 | Na$_2$CO$_3$ | 53 |
| Lauric | 200 | | |
| Caprylic | 144 | | |
| Caproic (6 carbons) | 116.6 | | |

| Acid Needed to Neutralize | .01 gram base | | | | .005 gram base | | | |
|---|---|---|---|---|---|---|---|---|
| | NaOH | KOH | NH$_4$OH | Na$_2$CO$_3$ | NaOH | KOH | NH$_4$OH | Na$_2$CO$_3$ |
| Stearic | .071 | .051 | .081 | .054 | .036 | .025 | .040 | .027 |
| Oleic | .071 | .050 | .081 | .053 | .036 | .025 | .040 | .027 |
| Linoleic | .070 | .050 | .080 | .054 | .035 | .025 | .040 | .027 |
| Palmitic | .064 | .046 | .073 | .048 | .032 | .023 | .037 | .022 |
| Lauric | .050 | .036 | .057 | .038 | .025 | .018 | .029 | .019 |
| Caprylic | .035 | .025 | .041 | .027 | .018 | .013 | .021 | .014 |
| Caproic | .029 | .021 | .033 | .022 | .015 | .011 | .017 | .011 |

Accordingly, the amount of fatty acid indicated for 100 grams of pigment ranges from 0.011 gram to 0.081 gram. This amount, however, is minimal. In most cases, because the fatty acids are weak acids and the bases are strong bases, more acid than the theoretical amount is needed to maintain neutrality of the adsorbed base. In addition, fatty acids are usually mixtures of several acids and commercially they only infrequently approach 100% purity. Consequently, the range of fatty acid to base can be set realistically at from 0.2 gram to 0.025 gram. There are cases where the metallic hydrate will adsorb large amounts of base, and cases where only small amounts of base are retained by adsorption.

Assuming that the slurry of aluminum oxide particles has been formed and that an aluminum hydrate has precipitated, none of this precipitate will combine with the fatty acid so long as there is any free (adsorbed) base in the hydrate. Once all of this adsorbed base has been neunum, manganese, iron, cobalt, nickel, calcium, magnesium, strontium and barium. None of the acidic oxides such as titanium, zirconium, hafnium, niobium, tantalum, tin and silicon will form metallic soaps, and thus only the adsorbed alkali will be neutralized.

In order to highlight the invention, the following examples are given as illustrative of the wide variety of particulate materials capable of being surface treated in accordance with the inventive method.

*Example I* ($TiO_2$)

100 grams of titanium dioxide, in the anatase crystalline form, and with an average particle size of 0.2 micron were slurried in 150 mls. distilled water. Two mls. of a solution of titanium chloride containing 0.2 gram $TiO_2$ were added and the slurry mixed thoroughly, and adjusted to 8 pH with a 10% aqueous ammonia solution. Into this slurry 8 mls. of a 10% solution of stearic acid in benzene were mixed with rapid agitation. The slurry was then filtered, and the filter cake washed with three displacements of water. The pigment was dried at 110° C. for four hours, then micropulverized. The final product was unwetted by water and wetted immediately with linseed oil.

The filtering, washing and drying procedure noted above was used for each of the examples, and therefore reference to this procedure is not repeated for each example.

Example II ($TiO_2$)

Forty-two grams of pigment-grade titanium dioxide (0.2 micron average particle size) were slurried in 61 grams of water containing 0.5 gram of $ZrOCl_2 \cdot 8H_2O$. The slurry was adjusted to 8 pH with ammonia and 0.4 gram of distilled tall oil acids was mixed into the batch. The product was dried at 110° C. and pulverized. The resulting powder was completely repellent to water and dispersed immediately in mineral oil.

Example III ($TiO_2$)

One hundred grams of titanium dioxide pigment (0.2 micron average particle size) in the crystalline form of anatase were slurried in 80 mls. of water. Three mls. of zirconyl chloride solution containing the equivalent of 0.05 gram $ZrO_2$ per ml. were added to the slurry and stirred thoroughly. The slurry was then neutralized with ammonia to 7.5 pH. To this was added 0.3 gram of oleic acid dissolved in isopropyl alcohol, and the mixture was agitated for 10 minutes. The slurry was then filtered and washed with distilled water. The filter cake, a wet pulp, was dried at 105° C. and ground in a mortar. The product was a fluffy white pigment which could not be water wetted but which dispersed immediately in raw linseed oil.

It is, of course, well known that titanium dioxide, either as the anatase or rutile crystal modification, is much less "wetted" by paint vehicle oils than is lead oxide and carbonates or zinc oxide, both of which are typically basic in the presence of paint vehicles which contain free fatty acids. The result is apparent throughout the entire history of a particular paint, the major effect being the typical powdering or chalking of a titanium dioxide paint during exposure. This does not happen to paints containing zinc oxide or lead pigments as the major constituent. While many attempts have been devised to eliminate, reduce or control this chalking effect of $TiO_2$, the present process of producing $TiO_2$ pigment which prefers oil to water is designed to effectively eliminate such chalking.

One of the most widely used extended titanium dioxide pigments contains 70% calcium sulfate and 30% titanium dioxide. This pigment, with extenders or diluents, is used extensively to produce flat, semi-gloss and similar paints. Generally, such paint compositions are particularly sensitive to moisture and humidity, and become thick and undesirable under humid conditions. When rendered hydrophobic and oil-wetting in accordance with the present invention, extended pigments of this type will produce a low viscosity flat paint. The viscosity is not appreciably increased by the addition of water to this paint.

It is also apparent that pigments produced in accordance with the invention have wide application in the cosmetic field, particularly as face powder or body powder, because of the free flowing character of the dried product, as compared with those products now on the market, which tend to cake or agglomerate, particularly under humid conditions.

Example IV (dyed $TiO_2$)

Forty grams of titanium dioxide pigment (0.2 micron average particle size) were mixed with 60 mls. of water and 1 ml. of a titanium chloride solution, equivalent to 0.2 gram $TiO_2$, was stirred in. The slurry was neutralized with ammonia to a pH of 7.5. Five mls. of a solution of oleic acid in isopropyl alcohol were added. The solution contained the equivalent of 0.4 gram of oleic acid and approximately 0.08 gram of an oil-soluble red dye. The slurry turned pink after agitation, because the dye was evenly distributed over the particle surfaces along with the oleic acid. The slurry was filtered and washed with distilled water. No dye was observed in the filtrate or wash water. The filter cake was dried in an oven at 110° C. and crushed in a mortar. A uniformly pink powder resulted that was both hydrophobic and readily dispersible in organic solvents. Obviously, other suitable dyes could be used to produce colored pigments with the opacity of titanium dioxide.

An example of zinc oxide pigment powder treated in accordance with the present invention is as follows.

Example V (ZnO)

Forty grams of zinc oxide powder (0.3 micron average particle size) were mixed in 60 mls. of water, 2.5 mls. of odorless kerosene containing 0.4 gram of oleic acid were added, and the slurry agitated. The slurry was dried at 110° C. in an oven and crushed. The resulting powder was hydrophobic and readily dispersed in organic vehicles.

It is to be noted that zinc oxide powder is slightly alkaline, and when mixed with water has a pH of approximately 7.5. This alkalinity is sufficient to combine directly with and retain small quantities of fatty acid.

Example VI ($ZrO_2$)

Forty-one grams of zirconium dioxide pigment with an average particle size less than 2 microns were slurried in 65 grams of water containing 0.2 gram of $ZrOCl_2 \cdot 8H_2O$. The pH was adjusted to 8 with ammonia and 0.85 gram of tall oil heads (85% free fatty acid) was stirred into the slurry. The composition was a thin liquid, so it was filtered and the filtered cake dried at 110° C. The ground product would not wet with water and showed immediate dispersion in mineral oil.

Example VII ($ZrO_2$)

0.25 gram of anhydrous magnesium chloride containing approximately 0.1 gram of magnesium oxide equivalent was dissolved in 100 mls. of water and mixed into 100 grams of zirconium dioxide with an average particle size of 0.3 micron. The slurry was neutralized to 9 pH with ammonia. 1.0 gram of distilled fatty acids (tall oil acids) was dissolved in 5 mls. of ethyl alcohol and mixed into the slurry. The mixture was dried at 105° C. and the dry product was pulverized. The product was strongly water repellent and easily dispersible in mineral oil. The untreated oxide easily dispersed in distilled water and wetted but flocculated in mineral oil.

Example VIII ($Sb_2O_5$)

Fifty grams of antimony pentoxide powder of less than 5 microns average particle size were slurried in 50 mls. of water and 0.75 ml. of 20% $ZrOCl_2$ (equivalent to 0.05 gram of $ZrO_2$) were added. After agitation, the slurry was neutralized with ammonia to 7.5 pH. Then, 0.8 ml. of 10% stearic acid in isopropyl alcohol (equivalent to 0.065 gram of stearic acid) was mixed in. The slurry was filtered and washed with distilled water. The filter cake was dried at 110° C. in an oven and ground in a mortar. The resulting powder was hydrophobic and easily dispersible in mineral oil.

Example IX (ultramarine blue)

One-hundred grams of a commercial ultramarine blue pigment having an average particle size of less than 1 micron were slurried in 100 mls. of water containing 0.2 gram of copper oxide as cupric nitrate. The slurry was alkalized to 8 pH with ammonia and 0.6 gram of distilled tall oil acids in isopropanol was then added. After filtering, washing and drying at 110° C., the resulting crushed powder floated on water. Sixty grams of the treated powder were mixed in 40 grams of No. 2 fuel oil, resulting in a thin mobile liquid, indicating excellent dispersion.

Example X (kaolin)

Forty grams of a commercial kaolin of 1–2 micron average particle size, were slurried in 60 grams of water which contained 0.2 gram $ZrO_2$ in the form of water-soluble zirconyl chloride. The pH of this slurry was adjusted to 8 by adding aqueous ammonia. At this point the slurry was extremely thick. 0.4 gram of free fatty acid, in the form of tall oil heads was mixed into the slurry. The product was then dried at 110° C., and by crushing, was easily reduced to the original fineness of the kaolin. This material could not be wetted with water, even when violently shaken with water.

When 20 grams of the untreated kaolin was mixed with 30 grams of mineral oil, a thick flocculated paste resulted; when 20 grams of the treated kaolin was ground in 30 grams of mineral oil, complete dispersion resulted and the mixture was a thin liquid.

Example XI (kaolin)

A solution of zirconyl chloride was made containing the equivalent of 0.05 gram of $ZrO_2$ per ml. 100 grams of dry ground Georgia kaolin with an average particle size of 3 microns were mixed with 100 grams of water and 1 ml. of the zirconyl chloride solution. This slurry was neutralized with 10% of ammonia to 8 pH. A thick flocculated mass resulted. 0.1 ml. of distilled tall oil acids was added to the mass and thoroughly stirred into it. The paste was then dried for 4 hours at 105° C. The dry mass was pulverized. This product was a fine, free flowing powder which did not wet in water. When 20 grams of this treated material was mixed with 30 grams of No. 2 fuel oil, a thin liquid resulted and the kaolin remained suspended in the oil. When 20 grams of the untreated kaolin was mixed with 30 grams of No. 2 fuel oil, a very thick flocculated paste resulted, and oil separated from the mass on standing.

Example XII (kaolin)

One-hundred grams of a commercial kaolin (average particle size range of 1–2 micron) were slurried with 150 mls. water and 6 mls. of an aluminum sulphate solution containing the equivalent of 0.3 gram aluminum oxide in solution was added. The slurry was adjusted to 9 pH with 10% ammonia. In this were then stirred 6 mls. of isopropyl alcohol containing 0.6 gram of distilled tall oil acids. The kaolin was then separated by filtration, washed, dried at 110° C. and pulverized. A 60% slurry of this treated material in No. 2 fuel oil was a thin liquid, while a 60% slurry of the untreated kaolin in No. 2 fuel oil produced a thick flocculated paste. The treated kaolin would not wet in water.

Example XIII (kaolin-resin)

One-hundred grams of a commercial kaolin of 1–2 micron average particle size were slurried in 150 mls. of water which contained 0.2 gram $Al_2O_3$ as $AlCl_3$. The pH of the slurry was adjusted to 8 by adding aqueous ammonia. At this point the slurry was extremely thick. 0.8 gram of distilled tall oil acids in isopropanol was mixed into the slurry. Following this, 0.2 gram resorcinol in isopropanol was mixed into the slurry. The product was dried at 110° C. after filtering and washing, and then pulverized. This material floated on water and mixed more easily in No. 2 fuel oil than the same kaolin with no treatment.

Example XIV (kaolinite)

1.1 grams of aluminum sulfate $(Al_2(SO_4)_3 \cdot 12H_2O)$ were dissolved in 100 grams of water and mixed with 100 grams of kaolinite having an average particle size of 3 microns. The slurry was adjusted to 7.2 pH with dilute aqueous ammonia. 1.2 grams of stearic acid were dissolved in 5 mls. of isopropyl alcohol and mixed into the kaolinite slurry. Some of this was dried at 105° C. The balance was diluted with 3 volumes of water, filtered, and the filtered cake washed with one displacement of distilled water, then dried at 105° C. The coating which was placed on the kaolinite consisted of 0.2 gram of $Al_2O_3$ and 1.2 grams of stearic acid. Both samples proved to be strongly water-repellent, the washed sample possessed a slightly lighter color. In each case the texture was soft and silky, and both samples readily dispersed in organic liquids.

Example XV (wollastonite)

Forty grams of $CaSiO_3$ powder of 5 microns average particle size were slurried in 60 mls. of water and 5 mls. of an $Al_2(SO_4)_3$ solution equivalent to 0.05 gram of $Al_2O_3$ were added. After stirring, the slurry was neutralized with ammonia to 7.5 pH. To this was added 0.2 gram of distilled tall oil acids diluted in isopropyl alcohol and the mixture agitated. The slurry was then filtered and washed with distilled water. The filter cake was dried at 110° C. and ground in a mortar. Particles of the resulting powder floated on the surface of water, and were readily dispersible in linseed oil.

Example XVI (calcium carbonate)

Forty grams of precipitated reagent grade calcium carbonate powder of approximately 20 micron average size were treated as in Example XV. The resulting powder was hydrophobic and readily dispersed in mineral oil.

Example XVIII ($CaCO_3$)

One-hundred grams of the aforesaid reagent grade precipitated calcium carbonate were slurried with 150 mls. of water containing the equivalent of 0.05 gram of zirconium dioxide in the form of zirconium oxychloride. The slurry was then adjusted to 8 pH with a saturated solution of barium hydroxide. To this slurry one ml. of isopropyl alcohol containing 0.1 gram stearic acid was added, and rapidly agitated. The treated calcium carbonate was separated by filtration, the barium chloride washed out with distilled water, and the washed calcium carbonate dried at 100° C. The product was water repellent and dispersed readily in mineral oil.

Example XVIII ($CaCO_3$)

One hundred grams of the same reagent grade precipitated calcium carbonate were slurried in 150 mls. distilled water containing the equivalent of 0.05 gram copper oxide in the form of cupric nitrate. The pH was adjusted to 8 with 10% potassium carbonate solution. One ml. of a 10% solution of tall oil heads in isopropyl alcohol was added and thoroughly mixed into the slurry. The calcium carbonate was separated, washed and dried. It was colored slightly green and was completely water-repellent.

Example XIX ($CaCO_3$—polycarboxylic acid)

One hundred grams of the same reagent grade precipitated calcium carbonate were slurried in 150 mls. of distilled water containing the equivalent of 0.05 gram ferric oxide as ferric chloride. Ten percent sodium hydroxide was added to a pH of 9. 0.1 gram of a commercial long-chain dimer acid (95% $C_{36}$ dibasic acid, 4% $C_{54}$ tribasic acid and 1% $C_{18}$ monobasic acid) in 2 mls. of isopropyl alcohol was added and mixed into the slurry. The separated, washed, dried calcium carbonate was water-repellent and oil dispersible.

Example XX ($CaSO_4$)

Anhydrite $CaSO_4$, was produced by neutralizing 93% sulfuric acid with a 15% slurry of CaO in water to the point where the filtrate contained 15 grams/l. of $H_2SO_4$. The slurry was stirred and heated to boiling until a sample examined in the polarizing microscope showed the presence of anhydrite only. The anhydrite was separated from the slurry by filtration, washed with water, and calcined at 875° C. for two hours. The average particle size was about 5 microns. It was then slurried in water and this slurry was then mixed with a solution of zirconium sulfate to produce a composition containing 300 grams of $CaSO_4$, 0.4 gram of $ZrO_2$ as $Zr(SO_4)_2$, and 700 grams of water. Ammonia was carefully added to this slurry with good agitation until 8.0 pH was attained. 0.8 gram of distilled tall oil acids was then stirred into the batch which was then dewatered on a vacuum filter. The cake was dried at 110° C. until no further loss in weight occurred. It was then pulverized and the product proved to be completely hydrophobic. It wetted immediately in oil, and produced a superior flat paint when combined with surface treated titanium dioxide (from Example III) in the ratio of 75% anhydrite to 25% anatase.

*Example XXI (carbon black)*

One hundred grams of a slurry of carbon black containing 32% solids with an average particle size on the order of 0.01–0.05 micron were ball milled to give a good mixture of carbon black and water. One percent of a dispersant, a polymerized sodium salt of aryl-alkyl sulfonic acids was added to aid in dispersing the powder. Five mls. of an $Al_2(SO_4)_3$ solution containing 0.25 gram $Al_2O_3$ were added. After agitation, the slurry was neutralized to 8 pH with ammonia. Ten mls. of distilled tall oil acids in isopropyl alcohol containing 0.78 gram of fatty acid were added and the slurry agitated. The slurry was filtered and washed with distilled water. The filter cake was dried in an oven at 110° C. and then crushed in a mortar. The resulting powder was hydrophobic and easily dispersible in No. 2 fuel oil.

*Example XXII (BN)*

Forty grams of boron nitride powder of about 40 microns average particle size were treated as in Example XV. The resulting powder was hydrophobic and easily dispersible in linseed oil.

*Example XXIII ($B_4C$)*

Forty grams of boron carbide powder of less than 15 microns average particle size were treated as in Example XV. The resulting powder was hydrophobic and readily dispersed in linseed oil.

*Example XXIV (SiC)*

One hundred grams of silicon carbide of 5 micron average particle size were mixed with 150 mls. of water to give a 40% solids slurry. Five mls. of an $Al_2(SO_4)_3$ solution equivalent to 0.05 gram of $Al_2O_3$ was stirred in. The mixture was neutralized with ammonia to 8 pH. 1.25 mls. of distilled tall oil acids in isopropyl alcohol equivalent to 0.1 gram of fatty acid was added. After agitation, the slurry was filtered and washed with distilled water. The cake was dried in an oven at 110° C. The dried cake was very easily broken up to a fine powder. The resulting powder was hydrophobic and mixed easily in mineral oil.

*Example XXV ($Al_2O_3$)*

One hundred grams of fused, ground aluminum oxide abrasive with an average particle size of five microns were mixed with 150 mls. of distilled water containing 0.05 gram soluble aluminum oxide in the form of aluminum chloride. Ten percent sodium hydroxide solution was used to adjust the mixture to 8.5 pH. One ml. of isopropyl alcohol containing 0.1 gram oleic acid was mixed into the slurry with good agitation. The alumina was then separated by filtration, washed with distilled water, and dried at 110° C. The dried product wetted immediately in paint varnish and was completely water repellent. A 60% slurry of the treated aluminum oxide powder in No. 2 fuel oil was very thin and had a viscosity (Brookfield) of 50 cps. compared to 10 cps. for the oil only, and 3,000 cps. for untreated $Al_2O_3$ powder in No. 2 fuel oil.

*Example XXVI (Zr powder)*

Zirconium powder, with an average particle size of 16 microns, was tested for sensitivity to static electricity and found to ignite when a spark of 0.004 joule passed between a needle point and the powder. One-hundred grams of this powder was treated with 20 mls. of water. One cc. of a solution of zirconyl chloride (0.1 gram of $ZrO_2$ per cc.) was added and well mixed. The powder quickly settled in the system. Five percent aqueous ammonia was added with vigorous stirring to attain 8 pH in the mixture. At this point, the powder mixed with zirconium hydroxide became flocculated and did not settle rapidly but became comparatively thick. 0.2 gram of tall oil distilled acids was added to the slurry and well beaten into it. The excess free water was decanted from the metal and the latter was vacuum dried at 40° C. The resulting powder required 0.018 joule in order to obtain ignition, showing a very marked decrease in sensitivity to static electricity. When the quantity of surfacing agents was increased from 0.3% to 1.0%, the powder required to cause ignition was 1.6 joule. In each case, the surface treated powder was hydrophobic and readily dispersible in mineral oil.

*Example XXVII (Al powder)*

Forty grams of 400 mesh (about 30 microns average particle size) aluminum powder were treated as in Example XV. The resulting powder was hydrophobic and easily dispersed in mineral oil.

*Example XXVIII ($Al_2O_3$)*

2.5 mls. of a zirconyl chloride solution containing 0.17 gram of $ZrO_2$ were added to 60 mls. of water. Forty grams of calcined alumina with an average particle size of 6 microns were dispersed in the solution. The slurry was neutralized with ammonia to 7.5 pH. 1.6 mls. of stearic acid in isopropyl alcohol containing 0.13 gram of stearic acid were added. After agitation, the slurry was filtered and washed with distilled water. The filter cake was dried at 110° C. in an oven and crushed in a mortar. The resulting powder was hydrophobic and readily dispersible in a clear varnish.

This powder was successfully molded into intaglio stones which were outstanding in their freedom from aggregates.

*Example XXIX (bauxite clay)*

Forty grams of bauxite powder with an average particle size below 40 microns were treated as in Example XV. The resulting powder was hydrophobic and easily dispersible in No. 2 fuel oil.

*Example XXX ($Fe_2O_3$)*

Eighty grams of iron oxide fume with an average particle size of 0.5 micron, recovered from an electric precipitator, were slurried in 80 mls. of water in which was dissolved cupric nitrate equivalent to 0.08 gram of copper oxide (CuO). This slurry was adjusted to 7.5 pH with 10% sodium hydroxide in order to precipitate copper hydroxide. Into this slurry was stirred 3.2 mls. of an isopropyl alcohol solution containing 0.16 gram of the commercial long chain dimer acid of Example XIX. The slurry was filtered and the filter cake washed with distilled water and dried at 110° C. The resulting iron oxide was not wetted by water and dispersed readily in mineral oil.

I claim:

1. The method of treating finely divided discrete particles which are insoluble in water but which produce a pH of 7 or less in water, in order to impart hydrophobic and organophilic properties thereto, said method comprising, producing an alkaline surface on each of said particles by forming an aqueous slurry of said particles in a hydrolyzable polyvalent metallic salt solution and by alkalizing said slurry beyond 7 pH with a water soluble base to precipitate a polyvalent metallic hydrate containing adsorbed base on and around said particles, and then neutralizing said surface while in said slurry with fatty acid, said hydrate, calculated as oxide, ranging from about 0.05% to about 2.0% by weight of said particles and said fatty acid ranging from the stoichiometric amount required to neutralize said adsorbed base to about 200% by weight of said hydrate, calculated as oxide.

2. A method of treating finely divided discrete particles which are insoluble in water but which produce a pH of 7 or less in water, in order to impart hydrophobic and organophilic properties thereto, said method comprising, producing an alkaline surface on each of said particles by forming an aqueous slurry of said particles in a hydrolyzable polyvalent metallic salt solution and by alkalizing said slurry beyond 7 pH with a water soluble base to precipitate a polyvalent metallic hydrate containing adsorbed base on and around said particles, the amount of said hydrate, calculated as oxide, ranging from about 0.05% to about 0.1% by weight of said particles and the amount of said base ranging from about 0.005% to about 0.01% by weight of of said particles, and then neutralizing said surface while in said slurry with an amount of fatty acid ranging from about 100% to about 200% by weight of the oxide content of said hydrate.

References Cited
UNITED STATES PATENTS

| | | | |
|---|---|---|---|
| 1,424,306 | 8/1922 | Hoskins | 106—308 |
| 1,946,054 | 2/1934 | Baldwin | 106—308 |
| 2,068,066 | 1/1937 | O'Brien | 106—308 |
| 3,025,179 | 3/1962 | Holbein | 106—308 |

TOBIAS E. LEVOW, *Primary Examiner.*

J. POER, *Assistant Examiner.*